US007130768B2

(12) United States Patent
Hofmeister et al.

(10) Patent No.: US 7,130,768 B2
(45) Date of Patent: Oct. 31, 2006

(54) METHOD AND DEVICE FOR FAULT DIAGNOSIS IN CONTROL SYSTEMS IN AN INTERNAL COMBUSTION ENGINE IN A MOTOR VEHICLE

(75) Inventors: Carl-Eike Hofmeister, Regensburg (DE); Michael Käsbauer, Neutraubling (DE); Martin Prenninger, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/967,437

(22) Filed: Oct. 18, 2004

(65) Prior Publication Data

US 2005/0114087 A1 May 26, 2005

(30) Foreign Application Priority Data

Nov. 21, 2003 (DE) ................................ 103 54 471

(51) Int. Cl.
*G06F 11/30* (2006.01)

(52) U.S. Cl. ...................................................... 702/183

(58) Field of Classification Search ................. 702/183
See application file for complete search history.

(56) References Cited

U.S. PATENT DOCUMENTS 5,041,976 A * 8/1991 Marko et al. ................. 701/29
5,491,631 A * 2/1996 Shirane et al. ................ 701/35
5,526,793 A * 6/1996 Johansson ................... 123/481
6,474,292 B1 * 11/2002 Frenz et al. ............ 123/198 D
2003/0139873 A1 * 7/2003 Birkner et al. .............. 701/108
2004/0254709 A1 * 12/2004 Kustosch et al. ............. 701/70
2005/0022588 A1 * 2/2005 Hayakawa et al. ........ 73/118.1

* cited by examiner

*Primary Examiner*—Michael Nghiem
*Assistant Examiner*—Cindy D. Khuu
(74) *Attorney, Agent, or Firm*—Baker Botts L.L.P.

(57) ABSTRACT

In control systems (5) for internal combustion engines (14) in motor vehicles it is known that fault diagnoses are carried out to ensure the functional reliability of the internal combustion engine (14) or the motor vehicle even in the event of a fault. If a fault symptom (1) occurs, the cause of the fault is determined and a diagnosis manager (3) is used as a rule to deactivate the defective control system (5) completely or to initiate an emergency operation function. It is proposed that all information relating to fault symptoms should be listed, the actual cause should be determined by comparison with stored fault profiles and as a result only the smallest possible restriction of the functions of the relevant control systems (5) should be initiated. This has the advantage that the control system (5) can as a rule continue to be operated despite their restricted functional scope.

19 Claims, 3 Drawing Sheets

METHOD AND DEVICE FOR FAULT DIAGNOSIS IN CONTROL SYSTEMS IN AN INTERNAL COMBUSTION ENGINE IN A MOTOR VEHICLE

PRIORITY

This application claims priority to German Application No. 103 54 471.2 filed Nov. 21, 2003.

TECHNICAL FIELD OF THE INVENTION

The invention is based on a method and a device for fault diagnosis in control systems in an internal combustion engine in a motor vehicle, which monitor the operational capacity of sensors, actuators and/or system functions and on identification of a fault symptom determine the actual cause of the fault.

BACKGROUND OF THE INVENTION

It is already known that an LIH manager restricts the functions of the control systems for example by activating an emergency operation function (LIH functions, Limp Home Function) or in the worst case scenario simply deactivates the relevant control systems. This maximum reaction to a fault in the control systems is initiated because the actual cause of the fault symptom is not known.

It is also known that fault symptoms of similar identification methods are combined in diagnosis methods. These methods have a Diagnostic Trouble Code, as set out in the ISO standard.

A method for the controlled operation of a device, in particular an internal combustion engine, in which fault symptoms are diagnosed, is known from DE 199 41 440 A1. Cross-influences from consequential faults can result from the fault symptoms, with the consequence that the actual system diagnosis of operating or control functions is highly complex and therefore difficult to analyze. Severe and lenient operating or control restriction requirements are first differentiated and evaluated when verifying cross-influences. The operating or control restriction requirements are then filtered such that no contradictions occur. After the cross-influences have been verified, a series of individual measures is authorized, possibly in combination with a plurality of measures, each of which is evaluated according to the severity of its intervention in the operation of the device. A matrix method is proposed for evaluating and analyzing the individual faults in the electrical diagnosis and the functional diagnosis. The matrices of the matrix are multiplied to produce a process plan. The process plan thereby takes into account temporal prioritization and the cross-influences of the diagnosed faults such that the device can be operated to perform to the maximum possible level.

A further fault diagnosis method is known from DE 197 23 097 C1. Here the mutual direct dependencies of the monitored operating functions are input in a matrix with a "1" or if there is no dependency with a "0". With dependent faults a so-called dilemma or deadlock results, which indicates that two monitored malfunctions cause a mutual dependency. This means that consequential faults can be distinguished from standard faults. If it is possible to break the mutual dependency of the two malfunctions, the causal fault can be determined. This process is referred to as validation.

SUMMARY OF THE INVENTION

The object of the invention is to specify a method or a device, with which the analysis of an occurring fault symptom can be simplified such that an underlying fault can be clearly identified. This object can be achieved by a method for fault diagnosis in control systems in an internal combustion engine in a motor vehicle, which monitors the operational capacity of sensors, actuators and/or system functions and on identification of a fault symptom determines the actual cause of the fault, comprising the steps of intervening in the functions of the control systems by a diagnosis manager such that only the smallest possible restriction results for operation of the motor vehicle, collecting all the information by the diagnosis manager relating to at least one fault symptom, which is a possible cause of a fault, and determining the actual cause of one or a plurality of faults with reference to a fault profile of the symptoms.

The object can also be achieved by a device for fault diagnosis in a control system in an internal combustion engine in a motor vehicle, comprising a diagnosis device to determine fault symptoms in sensors, actuators and system functions, a programmable diagnosis manager to analyze the fault symptoms and a system to limit the functions of the control systems, wherein the diagnosis manager is configured and operable to list information about fault symptoms, compare it with stored fault profiles, derive one or a plurality of fault causes from it and initiate an appropriate minimal intervention taking into account the seriousness of the occurring fault to limit the functionality of the relevant control system. The device can be used in a diesel or gas engine.

In addition to the fault symptom further information, in particular a modified system state resulting from a fault reaction, can be acquired and stored. The fault symptoms can be listed and stored in the form of a table. An appropriate minimum reaction can be initiated at a control system affected by the fault as a function of the nature and/or seriousness of the at least one identified fault. In the event of a serious, irreparable fault the control system can be deactivated. In the event of a less serious fault the performance of the control system can be restricted. The control range of the control system can be restricted. At least one repair attempt can be carried out to eliminate the fault symptom. If the repair attempt is successful no fault reaction can be initiated.

The method for fault diagnosis in control systems in an internal combustion engine in a motor vehicle or the device according to the present application has the advantage that the functional processes can be organized more simply and transparently due to the methodical process, because the fault(s) can be identified precisely. It is deemed particularly advantageous that the structure of control systems to date can be simplified, as their functional restrictions can be graduated and configured with minimum impact. A further advantage is also seen to be that the faults tests can be performed in modules, as the functions to be restricted can be validated separately and deadlocks are identified. In particular mutual regulation restrictions and mutual dependencies of the fault profiles can be tested in a specific manner. To date complex validation procedures had to be carried out due to the branching of the secondary reactions. With the subject matter of the invention however this is no longer necessary, as defined emergency operation reactions are used with a converging function control reaction. It is also advantageous that as a result of branching of the secondary reactions the system restrictions are converted.

Also new system requirements can advantageously be included in fault identification, as required by the customer or legislation, later via a corresponding interface. It is also advantageous that fault symptoms with an impact on safety can trigger direct fault reactions. New safety concepts can also be applied more easily.

In practice the management of fault diagnosis has become more transparent. Fault simulation programs can be created in modules, whereby parameter-dependent cross-links of emergency operation reactions can also be included in the simulation. The cycle of emergency operation system reactions can be tested, as it is possible in particular to determine a plurality of fault profiles synchronously.

Further advantageous potential is also for example deemed to exist in that other vehicle concepts have simply been extended and that the fault information can be read and used by external control systems, in particular also in the service workshop.

Advantageous developments and improvements of the method or the device result from the measures set out in the dependent claims. The possibility of acquiring and storing further information resulting from the reaction to the fault in the control system in addition to the original fault symptom seems particularly advantageous. For example further consequential faults can result from the influence on the engine controller. On the other hand specific consequential faults can also be excluded.

To ensure a clear transparency, the fault symptoms are advantageously listed and stored in the form of a table.

The precise diagnosis of an actual fault makes it possible to react easily to the resulting fault with an appropriate optimum fault reaction. In particular it can allow the performance of the control system to be influenced as a function of the seriousness or gravity of the fault, such that only minimal restriction results overall for the operation of the internal combustion engine, for example a diesel or gas engine.

In extreme cases, where the seriousness of the fault means there is no other effective remedy, the relevant control system is deactivated.

In the case of a less serious fault, provision is made to restrict the performance of the relevant control system, for example by blocking specific functions that are not currently required.

Alternatively there is provision for restricting the dynamics or control range of the control system.

One optimum solution is of course to repair the fault occurring in each individual case, so that it is not necessary to restrict the control system. This may for example be the case, if a jammed air duct valve can be rendered operational again by means of additional triggering signals.

The fault diagnosis device is advantageously used in a diesel or gas engine, as here in particular the control systems and regulators with their programs for injection or ignition are very complex and fault symptoms can therefore easily result.

BRIEF DESCRIPTION OF THE DRAWINGS

An exemplary embodiment of the invention is shown in the drawing and is described in more detail in the description below.

DETAILED DESCRIPTION OF EMBODIMENTS

For a better understanding of the invention it is first described with reference to FIG. 1 how the method for diagnosing a fault symptom (also referred to as a symptom) operates in the prior art. A fault symptom here is understood to be a state of a system or a control system, which indicates a fault. For example a voltage at a piezo-electric actuator or a control deviation can be too high. Malfunction of the system is referred to as a fault. For example there can be a sensor short-circuit, a jammed valve, a leak, etc.

Figure 1:
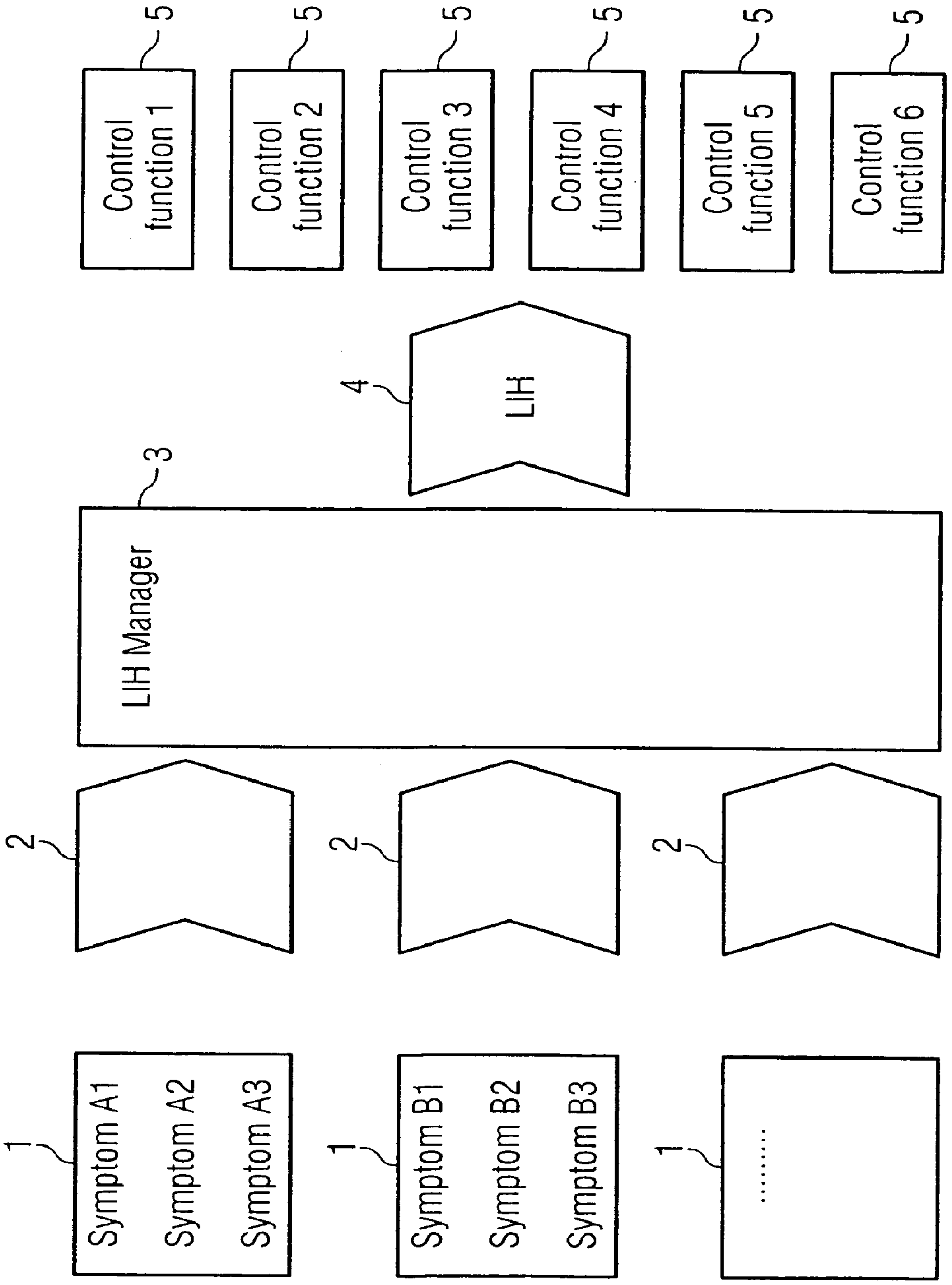
FIG 1 Prior Art
FIG. 1 shows a schematic illustration of a block diagram of the way in which fault diagnosis has been carried out to date in the prior art.

The fault symptoms 1 are listed in the left column with reference to FIG. 1. The fault symptoms 1 specified are the symptoms A1,A2,A3,B1,B2,B3 etc., which are assigned to the actual faults. For example the symptoms A1,A2,A3 include faults which relate to the injection of a diesel injection system: the injection valve does not close, a line has broken, there is no control voltage, etc. The symptoms B1,B2,B3 correspond to a different type of fault, for example a firing failure in a gas engine, etc. The coding makes it easy to process the individual fault symptoms 1 further by electronic means.

The second column contains a fault table 2, in which the individual codes (diagnostic codes) of the faults occurring are listed according to the ISO standard. This fault list is monitored by a diagnosis manager (LIH manager) 3, which later organizes the function restrictions of the corresponding control systems 5 with their control functions (control function 1 . . . 6). The LIH manager 3 thereby checks which type of fault has occurred and how serious its impact is. In the event of a fault the LIH manager 3 activates an LIH function 4 (Limp Home function, emergency operation function) and thereby restricts the functionality of the assigned control system 5. Emergency operation of the engine can thus be activated or an immobilizer deactivated, etc. As a rule the LIH function 4 is designed as a worst case reaction and is intended to ensure that a safe and stable state is resumed. Not just one control function of the control systems 5 but a plurality of control functions can be affected by cross-influences. With the inventive exemplary embodiment according to FIG. 2 however a different solution is proposed for diagnosing a fault and then implementing appropriate measures. The implemented measures have the objective of minimizing the restriction of functionality as far as possible to ensure a safe drive operation.

Figure 2:
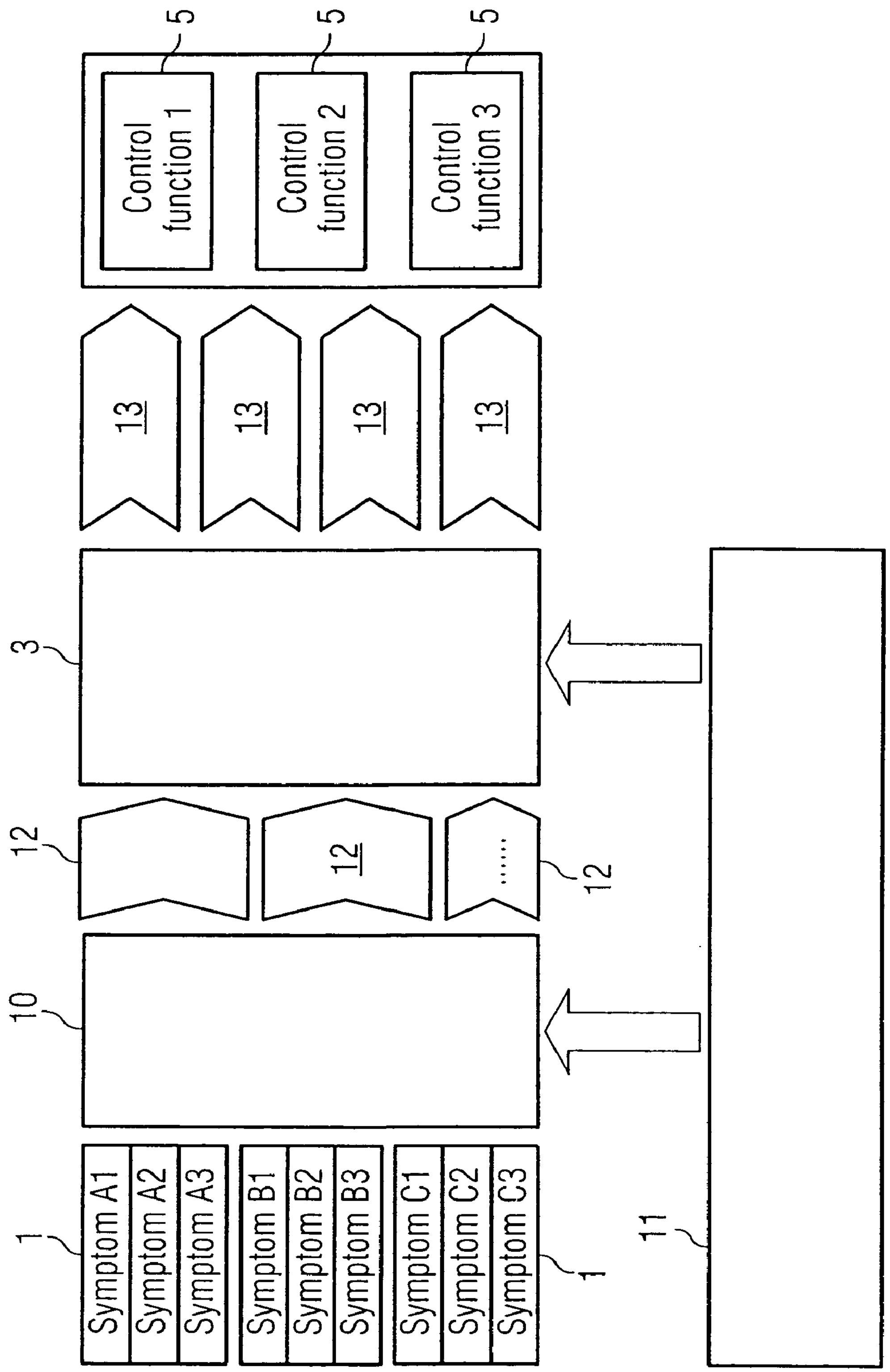
FIG. 2 shows a schematic illustration of a block diagram with the inventive fault diagnosis process.

First the fault symptoms 1, for example all fault symptoms 1 (symptoms A1,A2,A2,B1,B2,B3,C1,C2,C3 etc.) in the left column of FIG. 2 are listed and stored, preferably in the form of a table or matrix. In order to be able to react appropriately when fault symptoms 1 occur, it is necessary to determine the causal fault. To determine the cause of the fault therefore in addition to the symptoms A1–3,B1–3, C1–3 information is also acquired from a system definition 11 and in some instances also new system states, which have come about as a result of the fault reactions. The system definition 11 contains for example hardware definitions, vehicle variants, mechanical components and everything used in the engine or in the vehicle.

All the information thus obtained is used first by a diagnosis device 10 with reference to its fault profile to determine one or a plurality of actual faults. The diagnosis device 10 thereby checks the symptoms A1 . . . C3 and uses the fault profile to verify which mechanical/physical or electrical symptoms have occurred, which risks exist or which consequences can be drawn from the individual symptoms and the further information. Analysis follows using a diagnosis manager 3, which filters out one or if necessary a plurality of faults, collating them and storing them in corresponding fault lists 12. Transfer to a fault code, a fault confirmation or a generalization of the fault—as in the prior art—is possible but not necessary.

The analysis has the further advantage that cross-influences can be identified and eliminated with no further outlay, as the physical causes are known.

As the actual fault has been determined, the diagnosis manager 3 can now implement appropriate measures, which result in minimal restriction and optimum reliability of the control functions of the control systems 5. Depending on the nature and seriousness of the identified fault the diagnosis manager 3 implements appropriate measures from a catalog of measures 13, whereby the measures form the interface with the functions of the control systems 5. More detailed and specific intervention can thus be carried out in the control functions of the control systems 5 than would be possible with the prior art.

The catalog of measures 13 for example contains provision for deactivating one or a plurality of control functions of the control systems 5 using a shut-off function. Another alternative restriction involves for example limiting the control range of a control functions in particular in the upper range. This can be necessary in some circumstances where an air duct valve jams in the air duct with the result that the standard limit for exhaust gases is reached in an unwanted manner.

A further limiting option also involves limiting the performance of the control systems 5 and for example blocking an individual function.

It is also deemed particularly advantageous to eliminate the fault with an attempted repair. In some circumstances a jammed valve can be rendered operational again by means of modified control pulses.

In practice it can be necessary to initiate a plurality of measures at the same time to restrict functionalities. It can also be the case that new measures have to be implemented after said restrictions. This is also possible with the inventive method or device, as it is possible to react in a specific manner to each individual fault.

Figure 3:
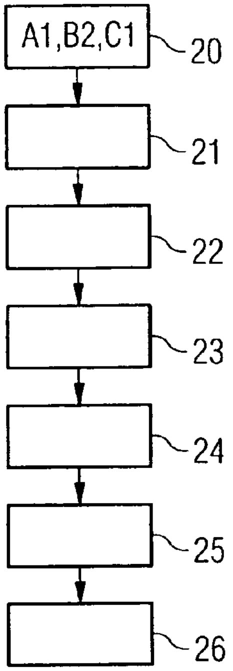
FIG. 3 shows a flow diagram of the function of an inventive diagnosis manager.

The flow diagram according to FIG. 3 shows in a schematic manner a functional process of the inventive diagnosis manager. The diagnosis manager is configured in the form of a software program and is preferably integrated in a main program of a corresponding control system. The mode of operation of the diagnosis manager is described in more detail below.

Fault diagnosis operates continuously and cyclically during engine or vehicle operation. The diagnosis manager is therefore constantly activated and monitors all the relevant systems such as sensors, functions, etc. If a fault occurs in a system, corresponding fault symptoms result. For example according to FIG. 3 in position 20 the fault symptoms A1,B2,C1 are determined by the diagnosis manager. In position 21 the symptoms are recorded in the form of a table or matrix. In position 22 analysis and assessment of the determined fault symptoms take place. The fault symptoms are thereby divided into different categories, for example functional faults, sensor faults, actuator faults, short-circuits to the battery or ground, line fracture, etc. In position 23 a comparison is carried out with stored fault profiles, which were simulated and stored beforehand for example using experiments or simulation programs for the individual fault causes.

Such a comparison allows the actual cause of the fault to be determined easily for the resulting fault symptom. Once the fault has been clearly identified, in position 24 the diagnosis manager creates a corresponding unambiguous fault word, for example 11100001, to facilitate further processing of the fault.

In Position 25 a decision is taken as to which minimal measure should be implemented to restrict functionality at the relevant control system. Available measures include for example reducing the performance scope, restricting a functional range, eliminating a fault and/or activating an emergency operation function (limp home reaction).

In Position 26 an intervention is made in respect of the corresponding functionality of the relevant control unit and if necessary corresponding notification is output to the driver of the vehicle. The program then restarts in position 20.

Figure 4:
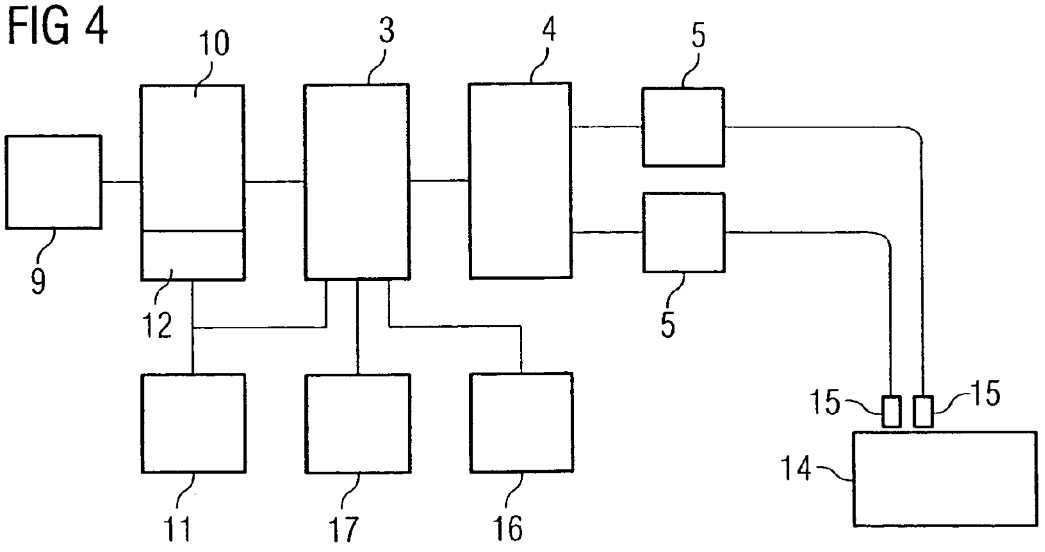
FIG. 4 shows a block diagram of the inventive fault diagnosis device.

FIG. 4 shows a schematic block diagram of an inventive device for fault diagnosis in a control system. A diagnosis device 10 is connected to a storage unit 9, in which the fault symptoms are stored. The diagnosis device 10 is also connected to a system definition 11, which contains all the important information for the control and operation of the internal combustion engine and the vehicle, as already described in detail with reference to FIG. 2. The diagnosis device 10 diagnoses the individual fault symptoms. For example it is verified why an air duct valve is defective. Also all further possible sources of faults are checked, which might occur in relation to the air duct valve. Those functions, which are fault-free, are excluded as possible fault sources. The verification is carried out until finally one or a plurality of unambiguous faults, in our example the jammed air duct valve, remain. The determined faults are stored in a fault list 12, which is accessed by the LIH manager 3. The LIH manager 3 accesses a program 17, which is configured for fault diagnosis and fault analysis. The program 17 can also be used to decide which measures should be initiated to restrict the functions.

In particular the LIH manager 3 must decide how to react so that the individual control functions are not mutually influenced by the restriction.

For this decision the LIH manager 3 accesses a storage unit 16, in which the catalog of measures is stored. It selects one or a plurality of appropriate decisions and then activates a system 4 to restrict the functions. The system 4 then controls the corresponding control systems 5, which for their part are connected to sensors, measuring devices, actuators 15 etc. for the internal combustion engine 14.

We claim:

1. A method for fault diagnosis in control systems in an internal combustion engine in a motor vehicle, which monitors the operational capacity of sensors, actuators and/or system functions and on identification of a fault symptom determines the actual cause of the fault, comprising the steps of:

intervening in the functions of the control systems by a diagnosis manager such that only the smallest possible restriction results for operation of the motor vehicle, wherein an intervention causing a smallest possible restriction is selected from the group of restriction measures consisting of: "using a shut-off function," "limiting the control range of a control function in particular in the upper range," and "blocking an individual function,"

collecting all the information by the diagnosis manager relating to at least one fault symptom, which is a possible cause of a fault, determining the actual cause of one or a plurality of faults with reference to a fault profile of the symptoms, and storing said actual cause.

2. The method according to claim 1, wherein the collecting all the information by the diagnosis manager relating to at least one fault symptom comprises collecting a modified system state resulting from a fault reaction.

3. The method according to claim 1, wherein the fault symptoms are listed and stored in the form of a table.

4. The method according to claim 1, wherein an appropriate minimum reaction is initiated at a control system affected by the fault as a function of the nature and/or seriousness of the at least one identified fault.

5. The method according to claim 4, wherein in the event of a serious, irreparable fault the control system is deactivated.

6. The method according to claim 4, wherein in the event of a less serious fault the performance of the control system is restricted.

7. The method according to claim 4, wherein the control range of the control system is restricted.

8. The method according to claim 1, wherein at least one repair attempt is carried out to eliminate the fault symptom.

9. The method according to claim 8, wherein if the repair attempt is successful no fault reaction is initiated.

10. A device for fault diagnosis in a control system in an internal combustion engine in a motor vehicle, comprising a diagnosis device to determine fault symptoms in sensors, actuators and system functions, a programmable diagnosis manager to analyze the fault symptoms and to limit the functions of the control systems, wherein the diagnosis manager is configured and operable to list information about fault symptoms, compare listed information about fault symptoms with stored fault profiles, derive one or a plurality of fault causes from the comparison, and initiate an appropriate minimal intervention taking into account the seriousness of the occurring fault to limit the functionality of the relevant control system, wherein the appropriate minimal intervention is selected from the group of restriction measures consisting of "using a shut-off function," "limiting the control range of a control function in particular in the upper range," and "blocking an individual function".

11. The device according to claim 10, wherein the diagnosis device acquires and stores a modified system state resulting from a fault reaction.

12. The device according to claim 10, wherein the diagnosis manager is operable to list the fault symptoms and storing them in the form of a table.

13. The device according to claim 10, wherein the diagnosis manager is operable to initiate an appropriate minimum reaction at a control system affected by the fault as a function of the nature and/or seriousness of the at least one identified fault.

14. The device according to claim 13, wherein in the event of a serious, irreparable fault the control system is deactivated.

15. The device according to claim 13, wherein in the event of a less serious fault the performance of the control system is restricted.

16. The device according to claim 13, wherein the control range of the control system is restricted.

17. The device according to claim 10, wherein the diagnosis manager is operable to carry out at least one repair attempt to eliminate the fault symptom.

18. The device according to claim 17, wherein if the repair attempt is successful no fault reaction is initiated.

19. The device according to claim 10, wherein the device is used in a diesel or gas engine.

* * * * *